United States Patent [19]

Clayton

[11] Patent Number: 4,780,927
[45] Date of Patent: Nov. 1, 1988

[54] METHOD AND APPARATUS FOR REMOVING AND COLLECTING DUST

[76] Inventor: James E. Clayton, P.O. Box 589, 30 Southard Ave., Farmingdale, N.J. 07727

[21] Appl. No.: 894,386

[22] Filed: Aug. 11, 1986

Related U.S. Application Data

[63] Continuation of Ser. No. 650,197, Sep. 13, 1984, abandoned.

[51] Int. Cl.$^4$ .............................. A47L 5/14; A47L 9/14
[52] U.S. Cl. .......................................... 15/345; 15/347
[58] Field of Search .................. 15/345, 347, 412, 352

[56] References Cited

U.S. PATENT DOCUMENTS

| | | | |
|---|---|---|---|
| 3,222,707 | 12/1965 | Allenbaugh | 15/345 |
| 3,510,905 | 5/1970 | Bannert | 15/345 |
| 3,731,340 | 5/1973 | Pitre, Sr. | 15/345 |
| 3,972,089 | 8/1976 | Parks | 15/345 |
| 3,978,547 | 9/1976 | Lawson | 15/345 |
| 4,072,483 | 2/1978 | Doyle, Jr. | 15/347 X |
| 4,205,412 | 6/1980 | Weber | 15/345 X |
| 4,310,945 | 1/1982 | Tribolet | 15/347 |

FOREIGN PATENT DOCUMENTS

| | | | |
|---|---|---|---|
| 2408072 | 8/1975 | Fed. Rep. of Germany | 15/345 |
| 2643067 | 3/1978 | Fed. Rep. of Germany | 15/345 |
| 7609633 | 10/1977 | France | 15/345 |

OTHER PUBLICATIONS

"Nilfisk Asbestos-Clene Systems", Nilfisk of America, Inc. (Date unknown.).
"Nilfisk Absolute—Vacuum Cleaners", Nilfisk of America, Inc. (Date unknown).

*Primary Examiner*—Harvey C. Hornsby
*Assistant Examiner*—Scott J. Haugland
*Attorney, Agent, or Firm*—David H. Semmes; Warren E. Olsen

[57] ABSTRACT

A portable device for removing and collecting dust, particularly from vehicle friction brake and clutch assemblies, comprises a base having a high efficiency filter and vacuum assembly, a transparent evacuation hood designed to surround the brake or clutch, a vacuum hose for removing contaminated air from the hood to the base, and adjustable means for disposing the hood at variable heights above the base. The filter and vacuum assembly, which may serve as a stand alone unit having application outside the automotive field, is oriented such that a disposable filter is located in a compartment upstream of the vacuum motors and may be removed from the base while the vacuum motors are running, thereby preventing dispersal of hazardous materials during the filter changing operation. Apertures provided in the hood include two gloved portals for allowing a worker's hands and arms to have unimpeded access to the brake and clutch assemblies. A highly portable embodiment includes an inflatable hood.

2 Claims, 4 Drawing Sheets

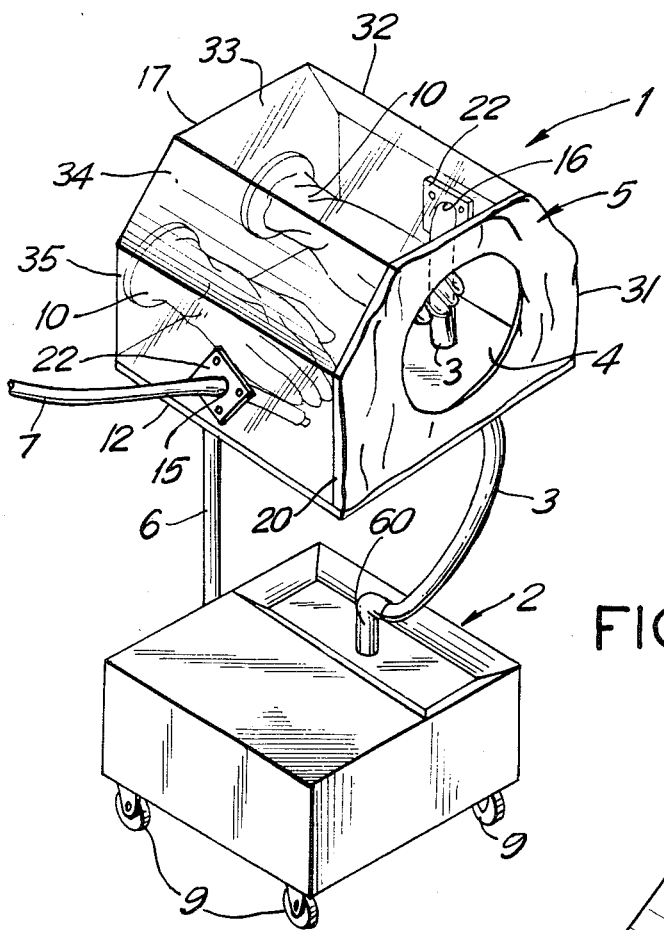
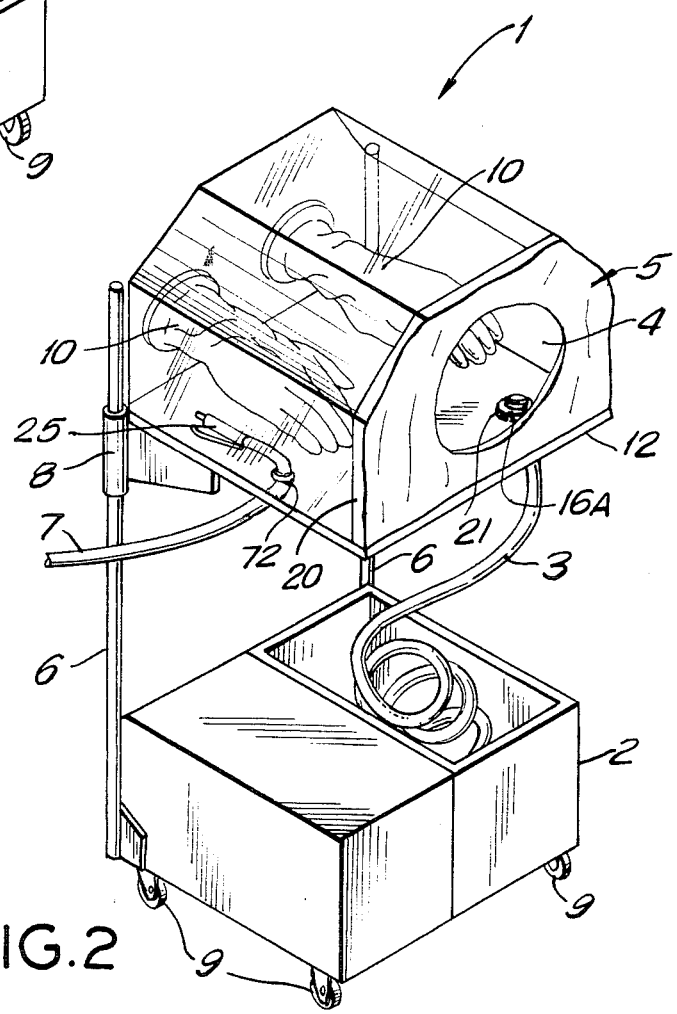

METHOD AND APPARATUS FOR REMOVING AND COLLECTING DUST

This is a continuation of co-pending application Ser. No. 660,197, filed on 9/13/84, abandoned.

BACKGROUND OF THE INVENTION

The invention pertains to dust collection and recovery devices. Particularly, the invention pertains to safety devices for removing and collecting vehicle friction brake and clutch dust while the same are exposed to a worker's environment.

The removal of contaminated dust from the workplace environment has long been a concern to workers, management and health care professionals. This concern has become increasingly more intense with the realization that certain forms of common workplace contaminants, notably asbestos, pose significant health risks. These risks are known to include asbestosis, mesothelioma and cancer. Therefore, from a safety standpoint it is imperative that hazardous dust, especially asbestos-containing dust, be efficiently and effectively removed from a worker's environment.

Vehicle friction brake and clutch assemblies are well known sources of hazardous dust. These assemblies typically contain contact surfaces, i.e., brake shoes or clutch pads, which generally consist of a compound of materials, including asbestos. Over time, the brake and clutch facings wear down through use and create dusty residues of the facing material. This asbestos-containing residue accumulates within the brake drum and the clutch bellhousing, and on or about the brake shoe and backing plate assembly.

The accumulated dust becomes troublesome when work is required to be done on a vehicle's brakes or clutch. When working, for example, on an automobile's brakes, the brake drum must be removed from the backing plate before the brakes can be inspected or replaced. However, during removal of the drum from the backing plate, asbestos-containing dust is released into the work area. Additionally, after removal of the drum, residual, asbestos-containing dust will remain on the brake shoes and backing plate.

Similarly, during clutch inspection or replacement, removal of the transmission from the bell housing exposes the interior clutch assembly to the worker's environment. During exposure of the interior clutch assembly, asbestos-containing dust will likewise be released into the worker's environment and residual dust will remain on the interior surfaces of the clutch assembly.

In each instance, i.e., whether working on a vehicle's brakes or clutch, asbestos-containing dust must be safely removed from the worker's environment in a manner which will protect the worker, other persons in the area, and the surrounding environment from contact with the toxic substance, asbestos.

In years past, the fastest and most common method of removing vehicle brake and clutch dust was to simply blow the dust off of the brake and clutch surfaces using a high pressure jet of air from, e.g., a shop air-hose. However, this action typically created a dark cloud of entrained dust which would contaminate the air for long periods of time. Workers inhaled and ingested this contamination and would often continue to expectorate the dust for hours following contact with it. Additionally, microscopic asbestos fibers are known to remain airborne for extended periods, up to 2 days and longer, creating a health hazard long after visible dust has settled.

Previous attempts to eliminate the unpleasant clouds of brake dust included surrounding the brake assembly with a hood and removing the dust through the combined application of high pressure air upon the brake assembly concurrently with the evacuation of the hood by use of a vacuum pump. Some devices even utilized filtration to one degree or another. The filtration problem, however, is complicated by the fact that the hazardous asbestos fibers are extremely small, often being less than one micron in size. Many prior brake dust recovery devices eliminated some macroscopic sized particles of dust but had no effect on microscopic particles, notably asbestos, which, as previously stated, are known to cause disease and cancer in man. These prior systems dealt with filtration of the particulate in one a cursory manner and failed to address the need to remove submicron sized particles from the air and from the surfaces of the housing. Indeed, many of these prior systems were concerned only with the removal of visible particles, e.g., dust clouds.

Prior art dust collection devices also generally lacked provision for the safe handling and disposal of the particulate after collection in the device. Particularly, typical prior art dust collection devices failed to provide safe and effective means for changing disposable filter bags. Prior art systems required the collection device to be fully open before the disposable filter could be removed, thereby exposing the worker to concentrated amounts of the very contaminant sought to be eliminated.

Previously disclosed brake dust removal and collection devices have proven to be inadequate from a practical standpoint as well. The prior systems were awkward and cumbersome to handle and generally comprised a plurality of components which needed to be individually moved to a work site and connected prior to commencement of work.

Further, all known prior brake dust removal and collection systems require the removal of the brake drum prior to positioning the device about the bracking plate and shoe assembly. During this time, i.e., while the brake drum is being removed prior to positioning the device, asbestos dust is being spilled onto the floor and dissipated into the worker's environment.

Further still, many of the hood-type enclosures used in prior brake dust removal and collection apparatuses were manufactured using mostly opaque material which restricts light to the brake assembly and consequently reduces worker visibility during the cleaning operation.

Size has also presented a drawback to the effective use of devices in the field of this invention. Most prior brake dust collection and removal devices were designed only for use with automotive sized brake assemblies. One manufacturer, Nilfisc, is known to offer a larger size dust removal and collection device for use with heavy truck brake drums. However, this manufacturer also recommends the purchase of an automobile size unit for smaller automobile brake assemblies. Therefore, the purchase of two of the previously known devices is ordinarily required to cover the full range of work typically present in vehicle shops.

Some of the prior brake dust removal devices provide an aperture in the hood of the device to allow an operator to insert his hand into the enclosure. The aperture is typically covered by a flexible diaphragm which is slit in a pie fashion to enable the operator to insert his hand and arm into the unit. A cottom sleeve is know to have been provided in one prior device to protect a worker's upper arm. However, no provision has previously been made to protect the worker's hand and arm from contacting the asbestos dust.

As previously mentioned, asbestos dust also presents a problem for workers handling vehicle friction clutch assemblies. There are no known devices or attachments to existing known brake dust removal and collection devices which are useful in removing and collecting asbestos dust from clutch assemblies.

There have been several U.S. Patents granted previously which are generally directed to cleaning systems for brake housings. These include U.S. Pat. Nos. 3,222,707 (Allenbaugh, 1965), 3,510,905 (Bannert, 1970), 3,731,340 (Pitre, 1973), 3,972,089 (Parks, 1976), 3,978,547 (Lawson, 1976) and 4,205,412 (Weber, 1980). It is believed that these apparatus have not gained any significant commercial acceptance.

One previous brake dust removal and collection device which is known to be commercially available is that sold by Nilfisk, Inc. under the trademark Asbestos-Clene. The Asbestos-Clene device comprises separate vacuum and containment units connected by a flexible hose. The device incorporates a high efficiency particulate air (HEPA) filter into the vacuum system. The Nilfisk system, however, has many of the limitations of the piror art which have been noted above. These limitations include the following: (1) The brake dust removal and collection device is size constrained. The device is available in automotive and truck sizes. The automotive size unit will not accommodate truck brake assemblies. The truck size unit may accomodate some automobiles, however, it is believed that its large size would result in little actual use of the device. Therefore, a busy automotive shop would be required to purchase separate units for trucks and automobiles. (2) The unit, being cylindrically constructed of steel or dark plastic, is opaque with the exception of a small window which allows only a limited amount of light to pass into the work area. Visibility inside the cylindrical unit is poor and during operation, when the drum is filled with a cloud of black dust, visibility through the window is extremely poor. (3) The access portal for the operator's hand is provided with a slit diaphragm or cloth sleeve which is intended to form around the operator's arm leaving it and the operator's hand exposed to asbestos dust. (4) The Asbestos-Clene containment unit is separate from the vacuum and requires a mechanic to handle and connect the two pieces of equipment. (5) The vacuum component to the system utilizes a "shakedown" bag for containment of the asbestos. This may raise the question of safety during the "shakedown" and subsequent filter changes. (6) The large truck size unit has two unprotected hand apertures for worker access to the brakes, but the apertures are 180° apart making simultaneous use thereof by one worker impracticable.

An essential attribute of any worker safety device is that it actually be used in its intended manner and for its intended purpose. However, a safety device which is difficult to work with will probably fail to be used in its intended manner and for its intended purpose by the worker who may forego use of the safety device to save time and convenience.

It is therefore an object of the invention to provide a brake dust removing and collecting device which will remove hazardous materials from the workplace and thereby improve the quality of a worker's environment.

It is a further object of the invention to provide a brake dust removing and collecting device which does not require removal of the brake drum prior to surrounding the brake.

It is a further object of the invention to provide a brake dust removing and collection device which may also be used to remove and collect hazardous dust from friction clutch assemblies.

It is a still further object of the invention to provide a hazardous dust removing and collection device which is convientient for a worker to use and effective and will hence be more likely to be used than were the devices of the prior art.

It is a still further object of the invention to provide a hazardous dust vacuum and filter assembly which is safe, effective and efficient.

It is yet another object of the invention to provide a brake dust removal and collection device which is highly portable and suitable for any size brake or clutch.

SUMMARY OF THE INVENTION

These and other objects of the invention are met by providing an apparatus for removing and collecting brake dust which comprises a base, having at least one motorized vacuum pump and a series of filters, one of which is a high efficiency particulate air H.E.P.A. filter designed to capture submicron size airborne particulate; a transparent hood designed to surround and engulf vehicle brake or clutch assemblies; means for evacuating contaminated air from the hood to the base; and supporting means for supporting said hood at a height above said base. Further embodiments of the invention include those wherein said supporting means provide variable height adjustment for disposing said hood at various heights above the base; wherein the base is mounted on rolling means for making the device movable and portable; and wherein the hood is provided with a plurality of apertures through which a worker's hands can be inserted into the hood to provide easy access to the brake assembly engulfed therein. The filter and vacuum assembly is oriented such that a disposable filter is located in a compartment upstream of the vacuum motors and may be removed from the base while the vacuum motors are running, thereby preventing dispersal of hazardous materials during the filter changing operation. An inflatable hood is provided in a highly portable embodiment of the invention which has particular utility in removing dust from clutch assemblies in addition to brake assemblies.

BRIEF DESCRIPTION OF THE DRAWINGS

The invention will be understood more fully by reference to the accompanying drawings, in which:

FIG. 1 is a three-dimensional drawing which illustrates a first embodiment of the invention wherein the hood is maintained in a fixed position above the base;

FIG. 2 is a three-dimensional drawing of another embodiment of the invention wherein the hood is slidably mounted on supporting means;

DETAILED DESCRIPTION OF THE DRAWINGS

Figure 3:
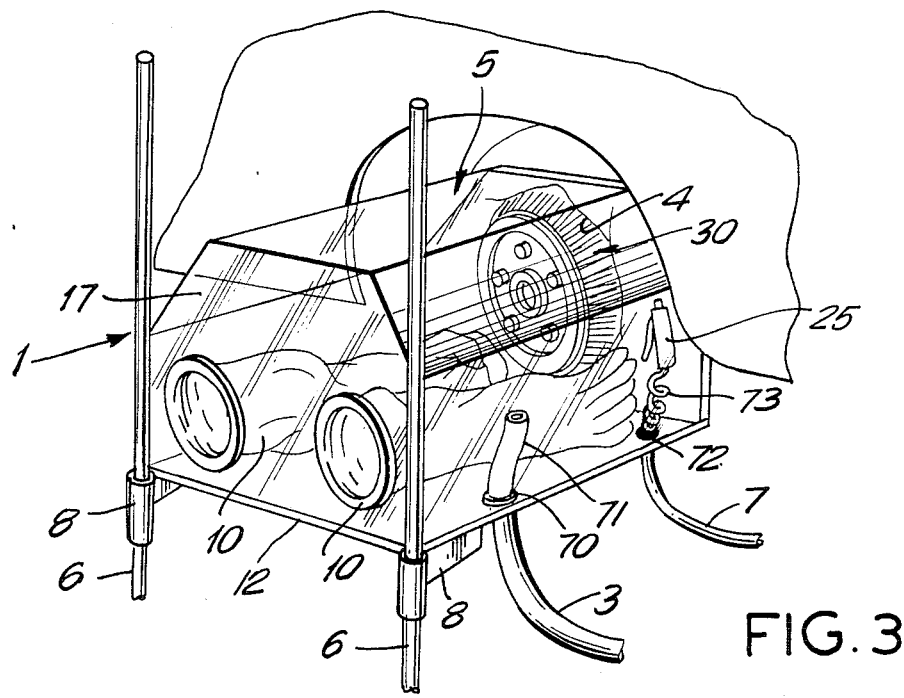
FIG. 3 is a three-dimensional drawing illustrating the hood of the instant invention engulfing a vehicle brake assembly.

A first embodiment of the instant invention will now be described by way of reference to FIG. 1. FIG. 1 illustrates a hood 1 fixably mounted via supporting means 6 at a height above the vacuum base 2. It is contemplated that the supporting means 6 may be rigid or semi-rigid providing a slight bend in the axis of support. A flexible air hose 3 is provided for removing air from the hood 1 to the vacuum base 2. The flexible hose 3 is connected to the vacuum base assembly through tube 60 and may be stored in a storage compartment in the base 2 when the device is not being use. When flexible hose 3 is disconnected from the base tube 60, the base 2 may serve as a stand along vacuum filter assembly.

As is illustrated in FIG. 1, the device is mounted upon rolling means 9 such as casters which make the device easily portable and enable the worker to transport the device from a stored position to a position where it will be utilized, such as to an automobile lift.

Vacuum base 2 comprises a vacuum motor assembly and a series of high filters, one being an H.E.P.A. high efficiency particle filter. A detailed decription of an illustrative vacuum base assembly 2 will be provided below by way of reference to FIGS. 5A through 5C.

In the embodiment of FIG. 1, the hood 1 is comprised of a rectangular metallic base 12 upon which are mounted five rectangular plastic sides 31–35 arranged and secured so as to form a hexagon with the base 12 when the hood is viewed from either the front or the back. The back 17 of the hood is likewise formed of clear plastic and has the same hexagonal shape as that formed by the base 12 and sides 31–35 to form an effective back therefore. The base 12 may be formed of metal to give the hood additional strength.

The back 17 is provided with two generally circular apertures through which may be permanently mounted and secured safety glove and sleeve combination 10, such as Titeline brand gauntlets manufactured by Renco Corporation, into which the operator's hands and arms may be placed while working on the brake assembly. The glove/sleeve combination should be sealed about the apertures to provide an air tight seal.

Figure 4:
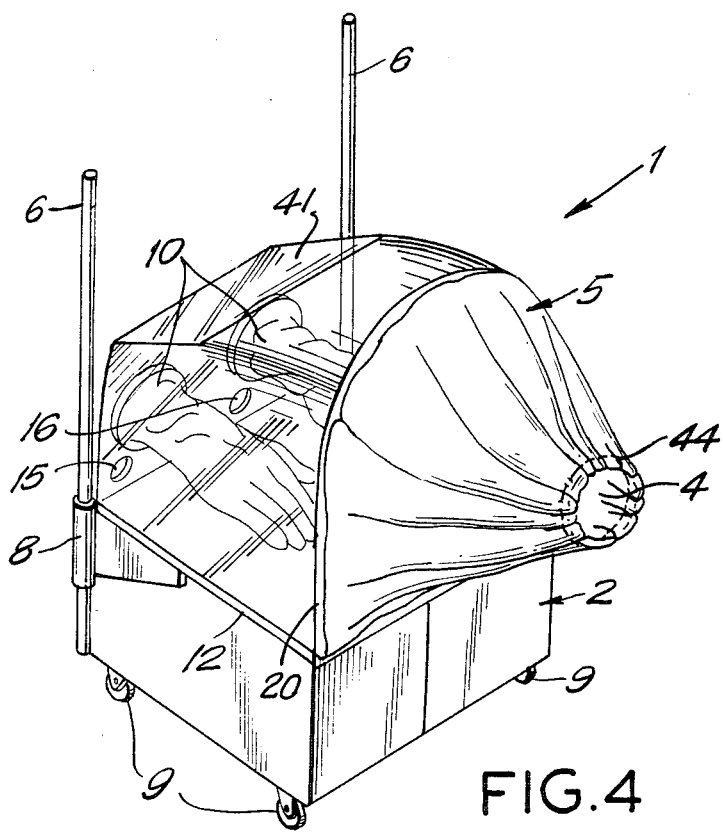
FIG. 4 is a three-dimensional drawing of a further embodiment of the invention wherein the hood is substantially rounded in shape, the hood being shown in its lower-most position along the support means.

Attached to the lip at the front end of the hood is a shroud-like element or gather 5 containing a passageway 4 through which the brake assembly would pass during use of the invention. The shroud 5, which may be constructed of a flexible plastic, rubber, fabric or cloth-like material, is not intended to form a vacuum tight enclosure around the subject brake assembly. Rather, it is intended that air be able to pass between the shroud and the brake assembly to assist in the evacuation of dust particles from the hood through the flexible hose 3 and into the vacuum base 2. A preferred shroud 5 includes gathering means such as an elastic cord or a grommet and lace assembly 44 (FIG. 4) about the passageway 4 as illustrated in FIG. 4.

Further apertures 15 and 16 may be provided through the sides of the hood 1 in the embodiment of FIG. 1. In FIG. 1, the vacuum hose 3 is shown extending through apperture 16 into the cavity of the hood, thereby providing a means for evacuating the dust-containing air from the hood 1 to the vacuum base 2.

Through another apperture 15 there may be placed a shop air hose 7. Such an air hose can assist the worker in removing dust particles from the brake assembly by providing a directed high pressure stream of air to the surfaces of the brake assembly which will cause any residual dust remaining there to become airborne so that the same may be evacuated through the flexible tubing to the vacuum base 2. Both vacuum hose 3 and air hose 7 should fit snugly through apertures 16 and 15, respectively, so as not to interfere with the vacuum removal of dust particles from the interior of the hood. Cover plates (not shown) may be secured at aperture rings 22 to effectively close apertures 15 and 16.

As stated above, the flexible vacuum hose 3 is provided to the hood through an aperture in the hood. The hose 3 may pass through an aperture in the hood (FIG. 1) or it can be affixed to a locking rim 21 mounted about an aperture 16A in the hood as shown in FIG. 2. In yet another embodiment (FIG. 3), the hose 3 can be fastened to a locking mechanism 70 mounted about an aperture in the base 12 of the hood 1. On the opposite end of the locking mechanism 70, inside of the hood, may be secured a further piece of flexible hose 71 which may be manipulated by the worker during operation of the device. During operation of the embodiment of FIG. 3, contaminated air will pass through the hose 71, into the vacuum hose 3 and eventually through to the base 2.

In the embodiments where the vacuum hose is provided into the hood, as in FIGS. 1 and 3, the hose further be equipped with a brushing mechanism or crevice tool (not shown) at the end thereof to allow the user to brush residual dust from the brake assembly surfaces or from the inside of the hood itself and thereby assist in the vacuum removal operation.

FIG. 2 further illustrates an embodiment of the invention wherein the hood 1 is adjustably mounted upon supporting means 6 such that the height of the hood may be conveniently adjusted to the plane at which the vehicle's brake are located. In the embodiment of FIG. 2, two cylindridal supporting rods 6 are rigidly secured to the base 2. The hood 1 is slidably secured to the support members 6 via grasping means 8 which in their open position allow the hood 1 to be slidably adjusted in the vertical axis along the support members 6 and which in their closed position securely lock hood 1 at a selected height. The height of the hood above the base may thereby be set to take accounts of the height of a vehicle mounted on a jack, on jack stands, or on a lift. Grasping means 8 may be fastened to either the base or the sides of the hood.

When the vehicle is at a proper height so that the fixed height device of FIG. 1 can be effectively used, or when the hood of the device of FIG. 2 is adjusted to the given height of the vehicle's brake, the hood 1 may then be horizontally rolled using casters 9 or otherwise moved into a position wherein the brake passes through the aperture 4 of the shroud 5, until the hood 1 engulfs the brake assembly. The shroud 5 may further be manually adjusted about the assembly if necessary. The side of the shroud material opposite the lip of the hood may be fabricated to include a grommet and lace assembly, elastic-type material, or otherwise so as to allow it to be gathered about the axle in a relatively secure fashion while still permitting an influx of air to supply the vacuum system.

FIG. 3 illustrates the hood 1 of the instant invention surrounding an automotive brake assembly 30. The brake assembly is passed through the shroud opening 4 and into the enclosure of the hood 1 and is ready to be worked on by the operator. It should be noted that with the device according to the instant invention, it is not necessary to remove the brake drum before positioning the hood 1.

With the invention so positioned as is illustrated in FIG. 3, the worker may then proceed with the brake removal process. First, the vacuum motor must be turned on (switch not shown) caused a vacuum current to pass through the hose 3. Then, the worker simply inserts his hands into the safety gloves 10 affixed to the back plate 17. The worker can then easily remove the brake drum and place the same on the metallic base 12 of the hood. Although brake dust will now be exposed, because of the vacuum the same will be contained inside the hood and ultimately be evacuated through the flexible hose 3 to the vacuum base and filter assembly. To assist in the removal of the brake dust, the worker can conveniently utilize an air gun 25 (FIG. 3) which may be connected to air hose 7 via quick-disconnect fittings through a bulkhead mount 72 about an aperture in base 12. The air gun 25 may be used to blow stubbornly adhering dust off of the various components of the brake or clutch assembly and disperse the dust into the enclosure whereby the same will be drawn into the flexible hose and to the vacuum base. The air gun may be attached to a coil hose 73 to give added flexibility. Tools which the worker may need during the operation, such as the air gun and certain wrenches or a pulling tool for removing a rusted or frozen brake drum, may be placed inside the hood before positioning the shroud about the brake.

FIG. 4 illustrates a preferred embodiment of the invention wherein the hood 1 has a substantially rounded or bubble shaped top. Such an embodiment is particularly contemplated for use in both automobile and truck applications, thereby eliminating the need for purchasing two separate pieces of equipment. A flat, transparent panel 41 may be built into the hood 1 of the embodiment of FIG. 4 at a location above the glove and sleeve combination 10 extending upward toward the vehicle so as to provide the operator with a clear, distortion free viewing panel to observe the work in progress. A similar transparent panel may likewise be built into the other embodiments disclosed herein.

Apertures 15 and 16 may be, of course, provided in the back, floor or sides of the hood of the device of FIG. 4, as in the embodiments of FIGS. 1-3, so that the hood may be connected to the air hose 7 and the vacuum hose 3 respectively. In FIG. 4, apertures 15 and 16 are shown within the back of the hood.

As is readily apparent from the drawings of FIGS. 1 through 4, the instant invention will provide superior operator visibility due to the transparent quality of the sides and back of the hood. Furthermore, access to the enclosed area of the hood is through a plane substantially perpendicular to the axis of the vehicle's brake and therefore provides comfortable, natural and efficient access to such vehicular parts.

The ease of use of the instant invention should also be readily apparent from the self-contained nature of the invention. The instant invention for the first time provides encapsulation means and vacuum removal apparatus in the same portable device.

The hood 1 may be fabricated of rigid, semi-rigid or flexible material or a combination thereof. It is generally contemplated that the hood material be plastic, but it may be combined or joined to rigid materials (such as metal, plastic or fiberglass). Particularly further contemplated is a highly flexible and collapsible hood such as the inflatable hood of FIG. 6 which may be folded up or otherwise compactly stored when the invention is not in use thereby making the invention highly portable. The collapsed hood may even be stored in a storage compartment in the base 2.

The hood of any embodiment disclosed herein may be designed largely enough to enclose large truck brake assemblies in addition to smaller automotive brakes, thereby eliminating the need to purchase two separate pieces of equipment.

A preferred vacuum-filter assembly, which may be incorporated into the vacuum base 2 of the instant invention, will now be described by way of reference to FIGS. 5A-5C which show side, end and top views, respectively, of the assembly.

The drawings show vacuum base 2 comprising a housing 40, a cover 67, an illustrative 1.5 inch plastic intake tube 60 which may form part of the flexible vacuum hose 3 or may be attachable to the vacuum hose 3, a disposable filter bag 55 such as a paper filter bag secured at the bottom of the intake tube 60, one or more pre-filters 54, a high efficiency particulate air (HEPA) filter of the type capable of capturing at least about 99.97% of particulate having a size larger than at least about 0.3 micron, and at least one and preferably two heavy duty vacuum motors 51 and 52 for providing vacuum current for the system.

The base 2 may also contain a storage compartment 68 for storing items such as a collapsible hood (see FIG. 6), tools, flexible hose 3, and an air gun 25. The storage compartment 68 may be provided between the unit cover 67 and the compartment cover 50. In that case, the compartment cover 50 could also be the base of the storage compartment 68.

The hose 3 may be detached from the tube 60 to allow the base to function as a stand-alone vacuum or dust collection mechanism.

Figure 5A:
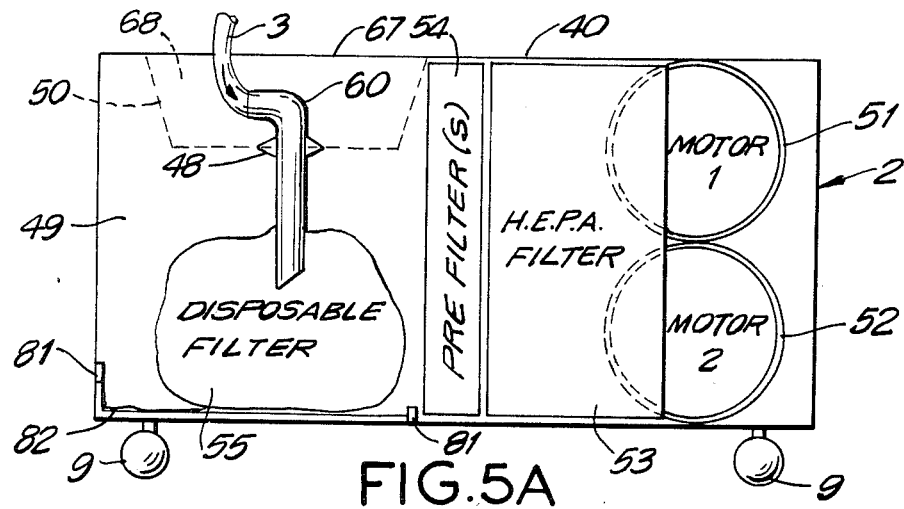
FIGS. 5A, 5B, and 5C are drawings showing the side, end and top views, respectively, of a filter and motor apparatus which may be utilized in a dust collection system such as in the base of a device according to the instant invention.
Figure 5B:
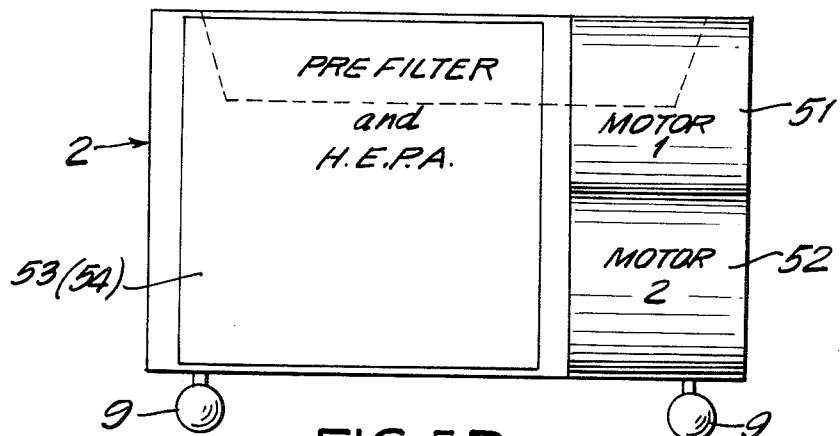
Figure 5C:
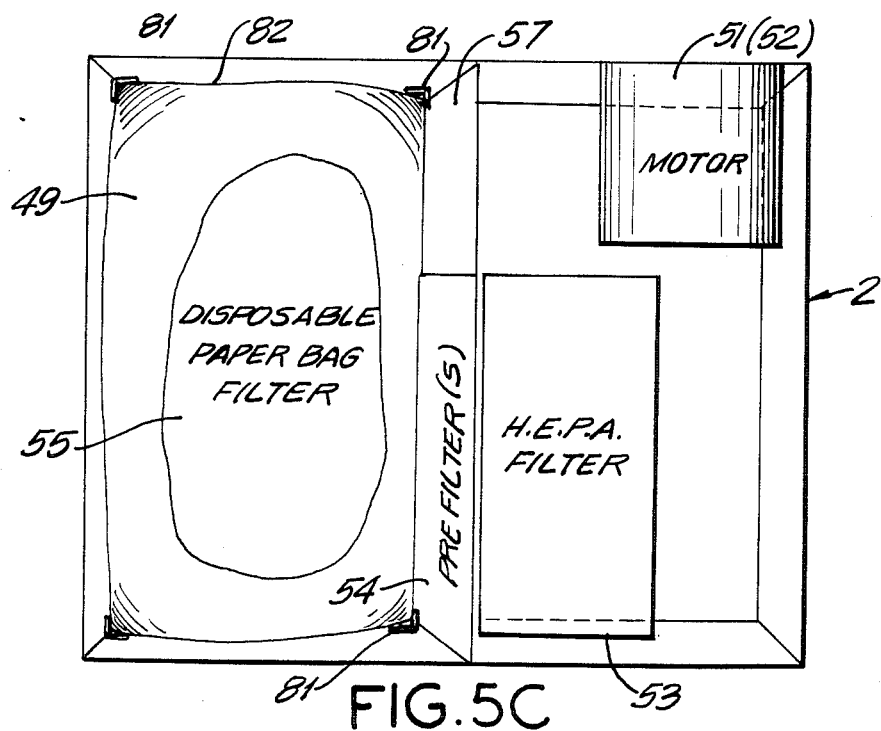

In the dust collector of FIGS. 5A-5C, the disposable filter bag 55 is positioned inside of a compartment 49 and access thereto is provided via intake tube 60 which extends from outside of compartment 49, through the compartment wall to the filter bag 55. Gasket means 48 provided in the compartment wall about the tube 60 ensure a tight seal to prevent vacuum lessening air to flow around the outside of the tube 60 and into compartment 49. Pre-filter 54 forms at least part of one wall of compartment 49.

During normal operation, the vacuum motors 51 and 52 are switched on (switches and power cords not shown) creating negative pressure within the base particularly in the area of the filters 53, 54 and the disposable filter compartment 49. Air is drawn in the direction of the arrow (FIG. 5A) through the intake tube 60, through the disposable filter bag which captures the bulk of the particulate present in the air stream, into compartment 49, through the pre-filter 54 which forms part of one wall of the compartment 49 and which captures smaller particles present in the air stream, through the HEPA filter which captures, e.g., 99.97% of all particles having a size of greater than 0.3 micron, and finally through the vacuum motor whereafter the purified air is exhausted from the base.

The vacuum filter base of FIGS. 5A-5C provides a significant safety advantage over prior art vacuum filter mechanisms of the same type. Prior art portable vacuum cleaning devices for collecting hazardous particulate typically consist of a tank or canister with an intake tube to which a vacuum hose is attached, upon which rests a lid assembly consisting of a lid, a vacuum pump, and a gasket intended to seal the union of the lid assembly and the tank or canister. The process of removing the collected substances, either liquid or dry, from the tank or canister of prior art devices requires the removal of the lid assembly from the tank. In so doing, the seal between the lid assembly and the tank is discontinued and it is therefore impossible to create a negative pressure environment in the tank. Thus, emptying the device exposes the environment and persons in the area to possible and even likely contact with the contents of the device. This exposure may jeopardize worker health and safety.

With the vacuum base of FIGS. 5A-5C, the changing of the disposable filter bag is significantly less of a health hazard.

As may be seen from FIG. 5A, the vacuum motors 51 and 52 are placed downstream of the filters 55, 54 and 53 so that only final, filtered air passes through the vacuum motors 51 and 52.

During the disposable filter changing operation, the compartment 49 which contains the disposable filter bag is designed to enable the operator to raise the compartment cover 50 a small amount (e.g., 1-3 inches) and to start the vacuum motor 51, 52 thereby creating a continuous negative pressure within the compartment 49 and its immediate proximity. This negative pressure causes surrounding air to flow into the compartment, washing the area with clean air and flushing free particulate into the prefilter 54 and HEPA filter 53 preventing the escape of dust into the environment or onto the operator. The disposable filter bag 55 may then be released from the intake tube 60 while the compartment cover 50 is raised to its fullest extend (i.e., the compartment fully open and accessible to the operator). It is important to note that with the filter vacuum base of the invention, the disposable filter is removed while the compartment is continuously washed with clean air thereby preventing contamination of the environment during the changing operation.

In another embodiment, a remote vacuum source may be connected to the vacuum base to replace the vacuum motors. Such a remote vacuum source could further comprise additional high efficiency filters for preventing the dispersal of dust into the environment.

The base 2 may incorporate a special set of clips or attachments 81 (FIG. 5C) within the compartment 49. These clips, attached to the side walls, are designed to retain a light weight plastic bag 82 so that it will not interfere with the air flow during the vacuum operation. During filter change, the plastic bag may be withdrawn from the clips and drawn up and over the disposable paper filter bag 55 surrounding it completely. The plastic bag 82 may then be sealed. With this embodiment, the operator never has to handle or contact the exposed paper bag 55. This plastic bag containing the disposable filter may then be removed from the base and disposed of in a proper manner. Before installing a new filter bag, another plastic liner may be inserted into the base and tucked behind the retaining clips 81. Then another disposable paper filter bag may be placed into the base and secured around the inlet tube 60. In the event that a secondary pre-filter panel 54 must be replaced, it too can be enclosed within the plastic bag 82 to minimize handling and reduce the risk of asbestos contamination.

A manometer or a timing mechanism 89 (FIG. 7) may be provided in the base to signal the operator that it is time to change the vacuum filters. The use of such devices would eliminate much of the guess-work involved in filter change timing. The manometer functions by measuring pressure drop before and after the series of filters and positively identifies the time when filters should be changed.

It will, of course, be understood that a removable cover may be provided about the outer frontal lip of any of the transparent hoods disclosed herein. The cover may be fabricated of such material as leather or vinyl so as to provide a secure, yet removable cover for storage purposes. Such a cover would serve the additional purpose of containing any excess dust which was not removed by the vacuum means from spreading outside the containment of the hood during storage.

Figure 6:
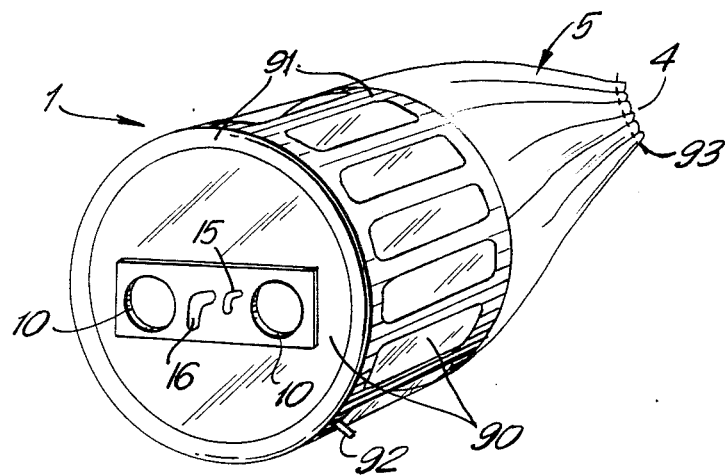
FIG. 6 is a three-dimensional drawing of an inflatable hood according to the instant invention.

FIG. 6 illustrates a highly portable embodiment of the hood of the instant invention wherein the hood 1 is fabricated of clear transparent vinyl 90 interspersed with inflatable air sacs 91 about the periphery of the hood. The hood 1 of the portable embodiment of FIG. 6 is generally cylindrically shaped having inflatable air sacs 91 mounted longitudinally about the length of the cylindrical hood and also circularly about the circular ends of the cylinder. An inflation valve 92 is provided for inflating the air sacs to their semi-rigid condition whereby they will be functional in creating a containment area within the inflatable hood for enclosing the object during the dust removal operation. As with the other embodiments disclosed herein, the back of the inflatable hood may be provided with portals 10 for securing hand and sleeve glove assemblies (not shown), a vacuum hose connection 16 through which the vacuum removal hose may pass or be connected, and an air gun connection 15 through which an air hose may pass or be connected. The front of the inflatable hood is further provided with a flexible fabric gather or shroud 5 having an opening 4 therein. A grommet and lace assembly 93, elastic material, or other gathering means may be provided about the end of the shroud opposite the front end of the hood 1 to gather the shroud about the axle or clutch housing.

Although FIG. 6 does not illustrate the adjustable supporting means 6, 8 illustrated in the embodiments of FIGS. 1-4, it is contemplated that such supporting means may easily be fashioned to support the inflatable device at either a fixed or a variable height above the vacuum base assembly. It is, however, further contemplated that the inflatable hood 1 (FIG. 6) need not necessarily be mounted on adjustable supporting means in all embodiments of the invention and that in many applications, such as in clutch operations, it would be preferred that the inflatable hood not be rigidly supported at a height above the base.

Figure 7:
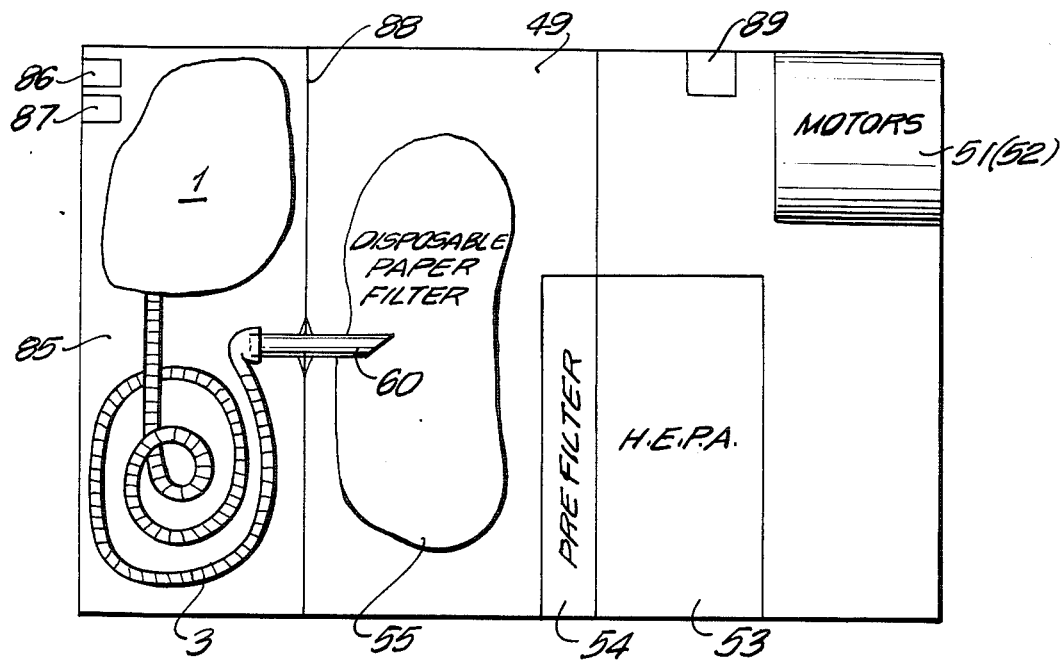
FIG. 7 is a top view positional drawing showing a vacuum base having a storage compartment for storing the flexible hood.

In its deflated state, the hood of FIG. 6 may be stored in a storage compartment 68 such as is provided in the base of the embodiment of FIGS. 5A-5C. A separate compartment 85 for storage of the portable hood may otherwise by provided adjacent to the disposable paper filter compartment 49 as shown in FIG. 7. The common wall 88 between the compartments may be provided with access for passage of the vacuum tube 60. Thus, hose 3 as well as flexible hood 1 may be stored in the storage compartment 85. The compartment 85 may also be provided with an air pressure regulator 86 and an air pressure gage 87 to assist in controlling inflation of the portable hood 1.

The portable nature of the embodiment of FIG. 6 is believed highly desirable for normal shop use and exceptionally desirable for road use. Additionally, the maneuvering ease of the inflatable hood makes it particularly well suited for use with vehicular clutch assemblies as well as brake assemblies.

It will, of course, be understood that the foregoing are only illustrative examples of the claimed invention and should in no way limit the spirit of the invention and the scope of the claims which follow.

I claim:

1. A dust collection apparatus, comprising at least a first compartment, a second compartment and partition, having an aperture therethrough, that separates the two compartments so as to enable safe replacement or either a disposable bag or a pre-filter from said first compartment that is maintained at a negative pressure with respect to ambient during a replacement of either said disposable bag or said pre-filter, said apparatus comprising:

an elongated housing that comprises said first and second compartments, wherein said first compartment can be opened to ambient only through a removable cover substantially defining a first surface thereof;

a disposable bag filter within said first compartment;

a pre-filter within said first compartment;

a high efficiency particle air filter capable of capturing at least about 99.97% of all particulate having a size of greater than about 0.3 micron, within said housing; and vacuum means within said second compartment;

wherein further, the disposable bag filter, the pre-filter, the high efficiency filter and said vacuum means are arranged in said housing so that said disposable bag filter is located in said first compartment upstream of said pre-filter, said high efficiency filter is located in a surrounding and sealing relation around the aperture through said partition and the pre-filter is mounted so as to be upstream of said high efficiency filter, wherein said pre-filter and high efficiency filter, that is in a surrounding and sealing relation to said aperture through the partition, are always upstream of said vacuum means, whereby the vacuum means located in said second compartment is both downstream of said first compartment and isolated therefrom by virtue of said high efficiency filter even when said first compartment is opened and said pre-filter is removed; wherein said first compartment is intended to be opened while said vacuum means are operating, thereby flushing said first compartment with air entering said first compartment by passing through said first surface to assist in the vacuum removal of any airborne dust particles proximate said first compartment into said second compartment and through at least said high efficiency filter while said first compartment cover is opened and either said disposable bag filter or pre-filter is being manipulated for replacement.

2. A method of safely remove a disposable bag or pre-filter from a first compartment of a dust collection apparatus by maintaining the first compartment at a negative pressure with respect to ambient, wherein the apparatus comprises an elongated housing having a first compartment that can be opened to ambient only through a removable cover substantially defining a first surface thereof and a second compartment that is separated from the first compartment by a partition, having an aperture therethrough; a disposable bag filter that is within said first compartment; a pre-filter is within said first compartment; a high efficiency particle air filter, capable of capturing at least about 99.97% of all particulate having a size of greater than about 3 micron, that is downstream of said pre-filter; and a vacuum means that is in flow communication to said high efficiency filter wherein further the disposable bag filter, the pre-filter, the high efficiency filter and said vacuum means are arranged in said housing so that said disposable bag filter is located in said first compartment upstream of said pre-filter, said high efficiency filter is located in a surrounding and sealing relation to the aperture through said partition so that both said pre-filter and the disposable bag filter are upstream of said high efficiency fitler, wherein the high efficiency filter is in a surrounding and sealing relation to said aperture through said partition so as to be upstream of said vacuum means, whereby, the vacuum means located in said second compartment is both downstream of said first compartment and isolated therefrom by virtue of said high efficiency filter even when said first compartment cover is opened and said pre-filter is removed; said method comprising the steps of:

A. turning on said vacuum means while said cover is closed;

B. opening said cover while said vacuum means is operating, thereby flushing said first compartment with air entering said first compartment by passing through said first surface to assist in the vacuum removal of dust particles in said first compartment through at least said high efficiency filter while said first compartment cover remains opened;

C. enclosing said disposable bag filter with a surrounding plastic bag while proximate the first compartment and removing the enclosed bag filter through said open first surface;

D. closing said cover prior to turning off said vacuum means.

* * * * *